United States Patent Office 3,591,473
Patented July 6, 1971

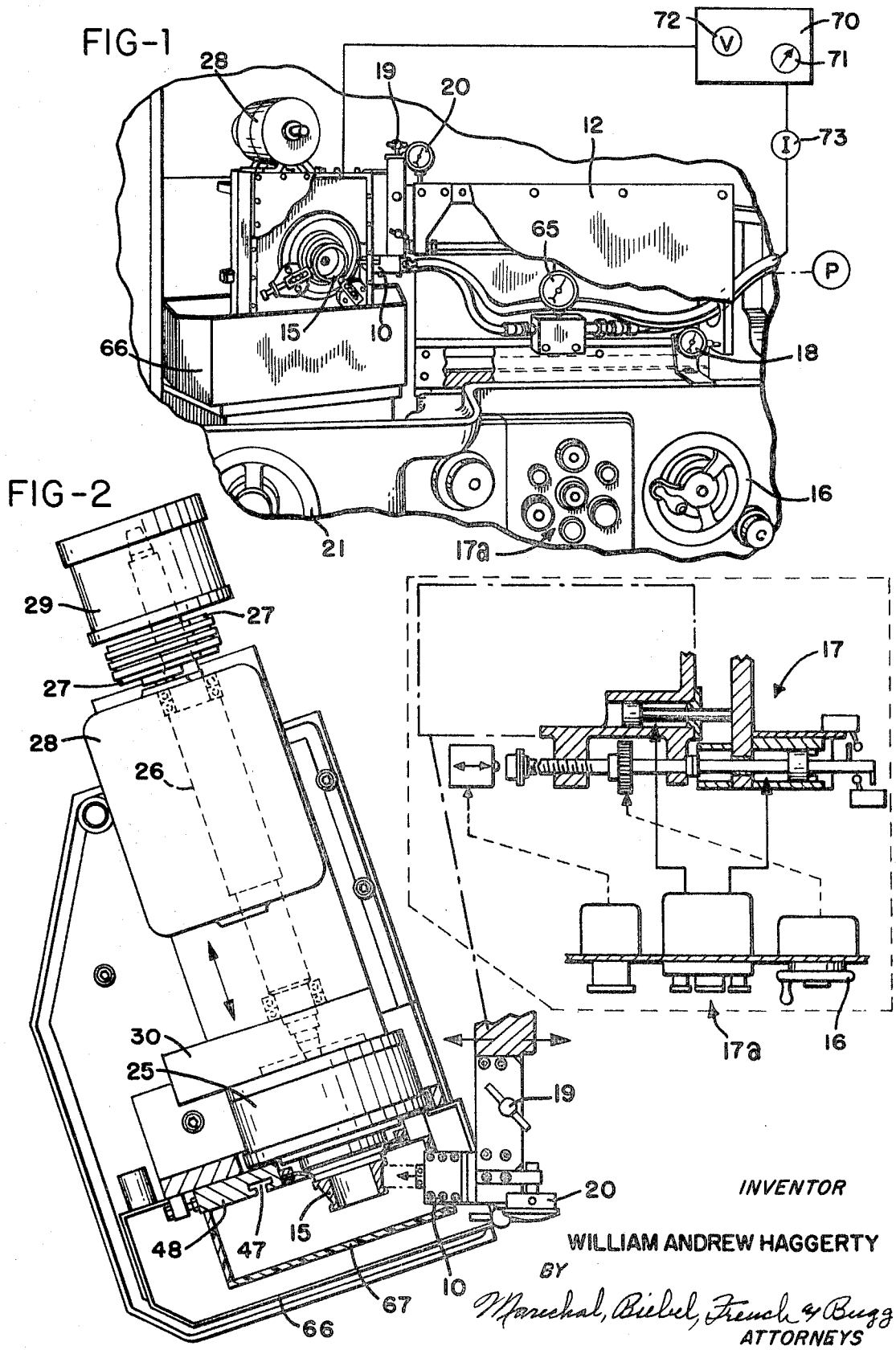

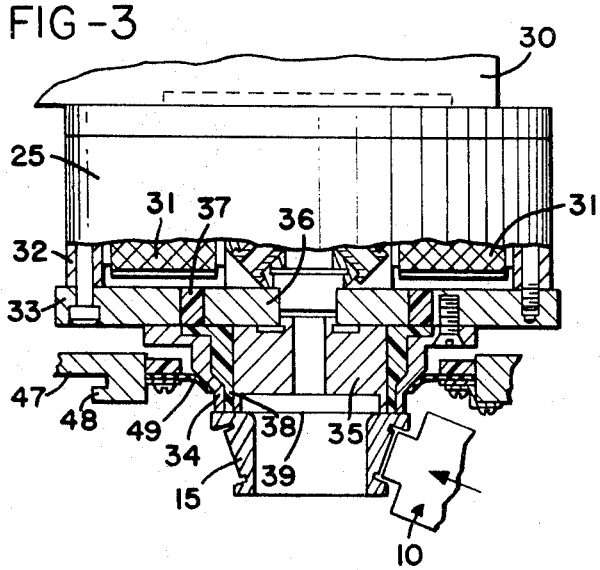
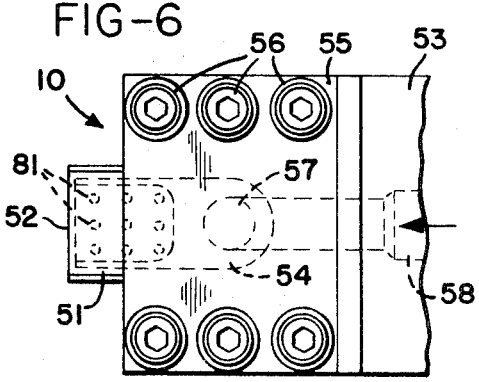
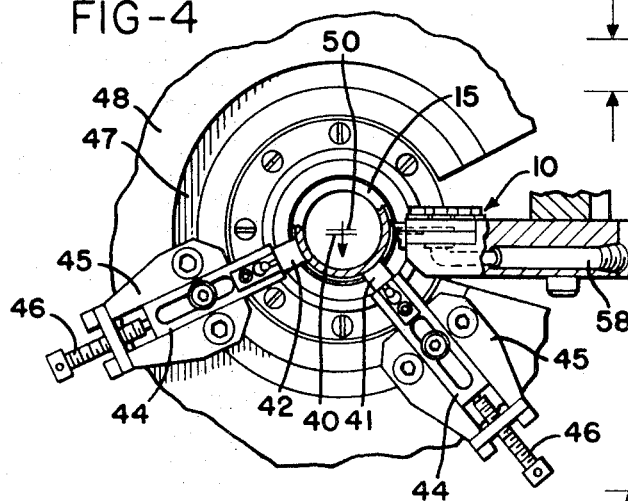
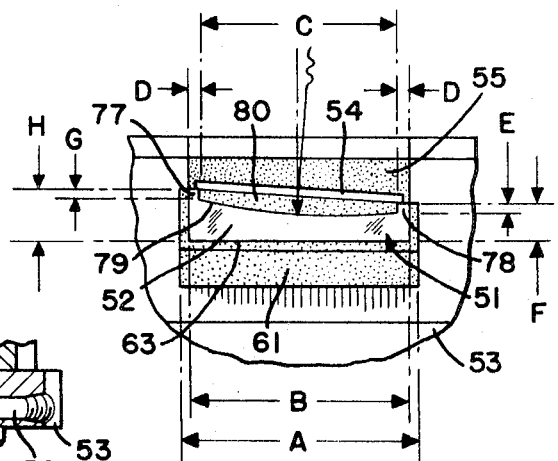
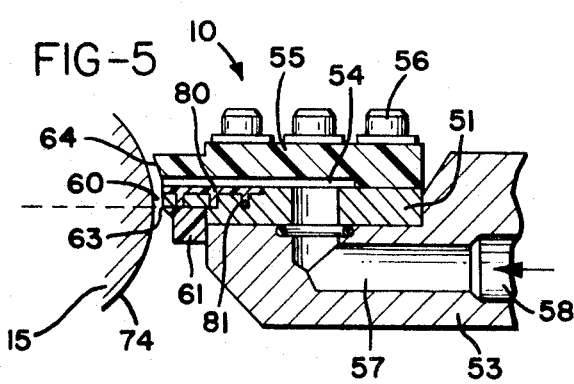
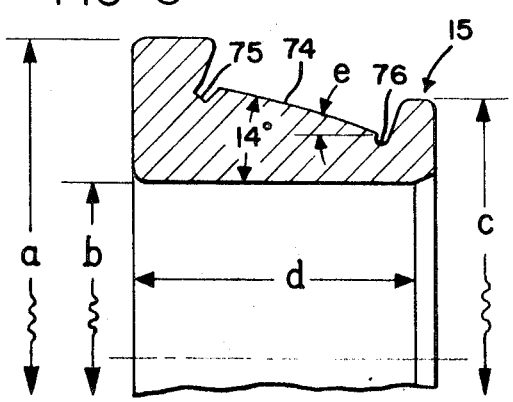

3,591,473
METHOD AND APPARATUS FOR ELECTRO-CHEMICALLY MACHINING ROTATING PARTS
William Andrew Haggerty, Cincinnati, Ohio, assignor to The Cincinnati Milacron Inc., Cincinnati, Ohio
Filed Apr. 8, 1968, Ser. No. 719,451
Int. Cl. B23p 1/00
U.S. Cl. 204—143
11 Claims

ABSTRACT OF THE DISCLOSURE

A method and apparatus for electrochemically machining workpieces to form surfaces of revolution to precise shapes and dimensions includes means rotating the workpiece on a pair of shoes engaging the surface of the workpiece being machined. An electrochemical machining tool is positioned so that its essentially flat frontal surface is normal to a line from said tool to the center of the workpiece when the workpiece has been machined to its desired dimension. A high velocity flow of electrolyte is forced between the tool and the workpiece and a high density flow of electrical current, approximately 6000 amperes per square inch, removes material anodically from the workpiece as it rotates past the tool to provide a smooth surface finish. The rate at which the tool is fed toward the workpiece establishes a steady state condition thereby keeping the gap distance constant, and thus the current density at a high substantially constant level. The electrical current is reduced to a predetermined magnitude, between 1500 and 3000 amperes per square inch, prior to terminating the machining operation to provide a bright, oxide free surface finish.

RELATED APPLICATIONS

Reference is hereby made to copending U.S. application Ser. No. 719,450 entitled Method of Electrochemical Machining and Ser. No. 719,452 entitled Method and Apparatus for Electrochemically Machining Rotating Parts, both applications filed on even date herewith.

BACKGROUND OF THE INVENTION

In the preparation of the bearing races, usually the bearing is first formed by turning on a screw machine and then heat treated to carburize the outermost surface layer. The outside faces of the bearing are then ground parallel to each other to define the total length of the bearing. Finally, the bearing surface is rough ground to approximately the desired outer diameter, finish ground, and then honed to obtain proper surface finish and diameter. Each of these three last mentioned steps requires separate machining operations.

It has been found that many grinding operations can be eliminated or reduced by using the electrochemical machining process, and in this example the rough or finish grinding as well as the honing operation can be replaced and more accurately and more quickly accomplished by using electrochemical machining. Furthermore, more complicated surface configurations can be obtained, such as crowning the bearing surface to increase its load carrying capacity, with each part machined having exactly the same configuration as every other part since the tool which does the machining is not worn or in any way modified during successive machining operations.

SUMMARY OF THE INVENTION

This invention relates to a method and apparatus for electrochemically machining a workpiece to form a surface of revolution thereon to precise dimensions and to smooth surface finishes. More particularly, the apparatus of this invention includes means to mount the workpiece for rotation adjacent an electrochemical machining tool. The tool is caused to move or feed toward the workpiece at the same rate as the surface of the workpiece is machined so that the gap distance between the tool and the workpiece is held to a constant value. A high velocity flow of electrolyte is supplied into the gap to remove the products of the reaction, to cool the workpiece and the tool, and to provide the path for current flow.

In the preferred embodiment, a magnetic chuck may be used to hold and to rotate the workpiece about a center of rotation. The workpiece is supported on a pair of shoes which engage, at spaced apart locations, the surface of the workpiece to be machined. These shoes are adjusted to displace the center of the workpiece away from the center of rotation of the chuck thereby causing the workpiece to be positively urged into engagement with the shoes as the workpiece is rotated. The workpiece is therefore magnetically held by the chuck for rotation while at the same time being allowed to slide continuously over a limited portion of the face plate or chuck during rotation. This arrangement permits easy installation and removal of workpieces from the chuck.

The electrochemical machining tool is positioned substantially at right angles to the line of displacement of the center of the workpiece from the center of rotation. This tool has a frontal machining surface surrounded by insulating material so that only the frontal surface of the tool causes machining action on the workpiece. An insulated electrolyte channel is provided through the tool to force a high velocity flow of electrolyte into the gap between the tool and the workpiece. The tool is supported by means which can move the tool toward the workpiece at a controlled rate, the rate being adjusted so that the gap between the tool and the workpiece remains substantially at a constant value throughout the machining operation. For some machining operations where only a small amount of workpiece material is to be removed, the tool may be positioned initially a predetermined distance from the workpiece and then left fixed in that position during machining, thus, the gap distance in this case will increase as the workpiece material is removed. Since the workpiece rides on supporting shoes, the initial machining operation effects rounding out with minimum amount of stock removal.

The electrical current density between the tool and the workpiece is maintained at the highest possible level consistent with the current carrying capacity of the tool and capacity of the power supply. At higher current densities, higher machining rates and smoother surface finishes are obtained, however, it has been found that with current densities in the order of 6000 amperes per square inch, ferrous materials will have a hazy, strawlike appearance when sodium nitrate is the electrolyte. Therefore, the current density may be lowered to a second predetermined level, typically between 1500 and 3000 amperes per square inch, to give the workpiece a bright, oxide free surface. Thereafter, the current is abruptly terminated to prevent lower current densities from leaving a black oxide coating on the workpiece.

The total current flow is limited, however, since many workpieces initially are out of round, or since a differential taper may exist between the workpiece and the tool prior to the start of the machining operation, thus causing the gap distance to vary across the face of the tool. Since current density is a function of gap distance for any given voltage, the current through the tool should be limited to a value below that which causes damage to the tool from melting, arcing, or distortion caused by the heat generated by the passage of electrical current therethrough.

Preferably, a gap distance of approximately 0.0015 inch is established and maintained between the tool and the workpiece. At a voltage of approximately fifteen volts, the current density of approximately 6000 amperes per square inch is obtained, thus giving high machining rates and smooth surface finishes.

To obtain surface finishes on the workpiece in the order of five micro-inch, arithmetic average, the power supply used to supply current between the tool and the workpiece must be substantially ripple free, having a variation in its voltage output of less than one-half percent, peak to peak. This power supply may be operated in either the constant voltage mode where variations in the gap distance will cause corresponding variations in current flow, thus facilitating the rounding up of rotating parts, or the power supply may be operated in the constant current mode where a specified amount of material may be removed from the workpiece regardless of its surface configuration.

An additional requirement for smooth surface finishes is a substantialy pure electrolyte which may be obtained through conventional high quality filtering means. In the preferred embodiment, the electrolyte is supplied to the gap between the tool and the workpiece at approximately ambient temperature and at a pressure in the order of 350 p.s.i. to obtain the flow rates for proper temperature control of the tool and workpiece and adequate removal of the reaction products of the machining operation.

Accordingly, it is an object of this invention to provide an improved electrochemical machining apparatus as described above wherein a workpiece is supported for rotation by a pair of spaced apart shoes engaging the machined surface for easy installation and removal, and machined by an electrochemical machining tool positioned at approximately right angles to the line of displacement of the center of the workpiece from the center of rotation with the tool having essentially flat frontal surfaces oriented normal to a line from the tool to the center of the workpiece when the workpiece has been machined to its desired dimension; to provide an electrochemical machining apparatus as described above wherein the tool is moved relative to the workpiece to maintain the gap dimension at a substantially constant distance, wherein the current density is supplied by a ripple free power supply and maintained at a relatively high and constant magnitude throughout the machining operation to provide a smooth surface finish; and to provide an improved method for electrochemically machining a workpiece to form a surface of revolution thereon by mounting the workpiece for rotation, displacing the center of the workpiece from the center of rotation to cause the workpiece to be urged toward the means displacing it, mounting an electrochemical machining tool substantially at right angles to the line of displacement of the workpiece with the frontal surface of the tool essentially normal to a line from the tool to the center of the workpiece when the workpiece has been machined to its finished diameter, supplying a high velocity flow of electrolyte under pressure between the tool and the workpiece, connecting a source of substantially ripple free electrical current between the tool and the workpiece to remove workpiece material anodically as it rotates past the tool, maintaining the gap between the tool and the workpiece at a substantially constant dimension by feeding the tool toward the workpiece at the same rate as the machined surface recedes from the tool as material is removed and maintaining the magnitude of the current density at a substantially constant high level to provide a smooth surface finish until the workpiece has been machined to the finished diameter.

BRIEF DESCRIPTION OF THE DRAWINGS

FIG. 1 is a front elevational view showing the overall arrangement of the various components which comprise the electrochemical machining apparatus of this invention;

FIG. 2 is a plan view of the electrochemical machining apparatus showing the workpiece drive assembly, the workpiece, the electrochemical machining tool, and a portion of the mechanism supporting the tool for movement toward the workpiece;

FIG. 3 is a plan view partially in cross section of the electromagnetic chuck for holding the workpiece;

FIG. 4 is a front elevational view, with a part of the workpiece broken away to show means slidingly engaging the machined surface of the workpiece at spaced apart locations to displace the center of the workpiece from the center of rotation of the supporting magnetic chuck, and also showing, partially in cross-section, the electrochemical machining tool;

FIG. 5 is an enlarged cross sectional elevational view of the electrochemical machining tool used in the preferred embodiment of the invention;

FIG. 6 is an enlarged plan view of the electrochemical machining tool;

FIG. 7 is an enlarged end view of the electrochemical machining tool; and

FIG. 8 is an enlarged cross-sectional view of half the workpiece.

DESCRIPTION OF THE PREFERRED EMBODIMENT

Referring now to the drawings, and to FIGS. 1 and 2 particularly, the electrochemical machining apparatus of this invention includes an electrochemical machining tool 10 mounted on a supporting means 12 which adjustably supports the tool relative to a workpiece 15. In the embodiment shown in these figures, the tool may be moved laterally by manually turning the handle 16 to establish a predetermined gap with respect to the workpiece, or the tool may be moved at a constant rate by means of the mechanism 17 shown generally in FIG. 2, with the rate of movement being determined by the setting of the controls 17a. The particular tool moving apparatus shown in the drawings is described in detail in U.S. Pat. 3,018,590. Of course, other means may be used to move the tool relative to the workpiece at any predetermined rate. The lateral position of the tool may be indicated by the gage 18. The tool may also be positioned vertically by turning the handle 19 with the position indicated by the gage 20. The workpiece may be positioned relative to the tool by turning handle 21. While the form of tool support shown is particularly useful, it is to be understood that other means of supporting the tool relative to the workpiece may be employed without departing from the scope of this invention.

The workpiece 15 is supported on a magnetic chuck 25 which is carried by a shaft 26 and is rotated by belts reeved on pulleys 27 attached to the shaft of the motor 28. A slip ring assembly 29, shown generally in FIG. 2, carries the electrical current for the electrochemical machining operation through the shaft 26 to the workpiece 15.

Referring to FIG. 3, the magnetic chuck 25 receives electrical current through a second slip ring assembly 30 which applies this current to a pair of coils 31 located within the chuck 25. The current through these coils generates a magnetic field which passes from one pole of the coils 31, through the cylindrical housing 32, an outer plate 33 to an outer collar 34, through the workpiece 15, an inner collar 35, an inner plate 36 and then to the other pole of the coils 31. A ring 37 of magnetically insulating material separates the plates 33 and 36 and an insulating collar 38 separates the collars 34 and 35. This arrangement permits the maximum number of magnetic lines of force to pass through the workpiece 15 thus holding it securely against the forward face 39 of the chuck 25. This face 39 is maintained relatively smooth to permit free lateral movement of the workpiece 15 on the face of the chuck.

Referring now to FIG. 4, the workpiece 15 is displaced from the center of rotation 40 of the magnetic chuck 20 by means of two spaced apart shoes 41 and 42 having a workpiece engaging surface formed to the same contour as the surface of the workpiece 15 which will undergo the electrochemical machining operation. These shoes are constructed of a material, such as tungsten carbide or ceramic, having sufficient hardness so that they will not be appreciably worn by abrasion with the surface of the workpiece.

Each of the shoes 41 and 42 is pivotally attached to a radially extending arm 44 which may slide within a tool holder 45 and which may be positioned radially by the screw 46. The pivotal attachment between the arm 44 and the shoes permits the shoes to follow the workpiece generally as it is machined and moves downwardly on a line between the shoes 41 and 42 due to the natural tendencies for the center of the workpiece to align itself with the center of rotation. The holders 45 are adjustably mounted within a T-shaped slot 47 formed in a plate 48 (see also FIG. 2). The plate 48 has a generally circular opening in its central portion through which the collar 33 of the magnetic chuck 20 extends. A rubber gasket 49, shown in FIG. 3, extends from the plate 48 into the opening and engages the outer surface of the collar 33 to prevent electrolyte from flowing behind the plate 48 and into the magnetic chuck 20 or the rotating parts of the chuck support.

The holders 45 are adjusted within the slot 47 at approximately a 120° angle with respect to each other and the shoes 41 and 42 are moved radially inwardly to displace the workpiece 15 along the line which generally bisects the angle between these two shoes. Initially, the center 50 of the workpiece 15 is positioned approximately 0.025 inch from the center of rotation 40 of the magnetic chuck 20. Since the machined surface of the workpiece slidably engages the shoes 41 and 42, the workpiece will be positively urged toward the shoes and the center 43 of the workpiece will move toward the center of rotation 40, or downwardly as viewed in FIG. 4, as the workpiece becomes smaller in diameter through the electrochemical removal of the workpiece material.

An electrochemical machining tool 10 is positioned at approximately right angles to the line of displacement between the shoes 41 and 42. A gap of a first predetermined magnitude, typically 0.0015 inch, is provided between the machining surface of the tool and the workpiece. The tool is positioned with its machining surface parallel to the surface of rotation of the workpiece and also parallel to the direction of movement of the workpiece toward the center of rotation as its diameter is reduced due to the electrochemical removal of the workpiece material. In the case where the tool remains stationary throughout the machining operation, the gap between the tool and the workpiece will increase as the material is removed, and unless the voltage is increased by a proportional amount, the current would tend to decrease. It is desirable that the current be maintained at a substantially high magnitude throughout the machining operation to provide the smoothest possible surface finishes. The current can be controlled either manually by the machine operator or automatically through the use of constant current electronic circuits. In the case where the tool is moved into the workpiece at the same rate as the workpiece material is removed, the current density will automatically tend to remain at a substantially constant value for a given voltage level.

The electrochemical machining tool is shown in FIGS. 5 and 7 and includes an electrically conductive plate 51 having a frontal machining surface 52 which is machined and lapped flat. This electrically conductive plate may be made out of brass or other similarly easily machined metal capable of carrying a high density electrical current.

An electrolyte passage 54 is created by mounting an upper insulating block 55 onto the plate 51 and securing both to the tool holder means of screws 56. This passage communicates with an opening 57 extending through the plate 51 into the tool holder 53. A passageway 58 in the tool holder carries the electrolyte from the supporting equipment into the tool, through the opening 57 and the passage 54 into the gap 60 between the tool and the workpiece.

An additional insulating block 61 is cast onto the plate 51 in the area next to the workpiece to prevent any stray electric currents from machining the workpiece thereby limiting the machining action to the frontal surface 52 of the tool. This block is tapered away from the frontal machining surface thus increasing the gap dimensions allowing the electrolyte to escape from the machining area. Both blocks 55 and 61 may be formed from a rigid and non-conductive fiberglass laminate, such as Formica type FF91, which also has low moisture absorption characteristics.

In the embodiment shown, the lower edge 63 of the tool is essentially straight and is aligned parallel to the axis of the workpiece with this edge being closer to the workpiece than any other portion of the tool. Preferably, when using a single tool, the frontal machining surface 52 is aligned perpendicular to the line between the center of the workpiece and the edge 63 of the tool when the workpiece has reached its finished dimensions.

The lower surface of the block 55 and the upper surface of the plate 51 are made relatively smooth in the area of the electrolyte passage 54 to facilitate the smooth flow of the electrolyte into the gap 60. Also, the frontal surface 64 of the insulating block 55 is curved or inclined as shown in FIG. 5 to provide a substantially constant gap distance and thus to urge the electrolyte to flow downwardly over the frontal machining surface of the tool as the workpiece rotates in a clockwise direction.

A high velocity flow of electrolyte is supplied by a pump into the gap 60 formed between the plate 51 and the workpiece at a pressure of approximately 350 p.s.i. as observed by the gage 65. The particular electrolyte composition depends on the type of material being machined. For iron base materials, the electrolyte solution is prepared by mixing four pounds of sodium nitrate per gallon of water. The electrolyte is maintained at substantially ambient temperature, and as it passes from the gap 60, it is collected in a tray 66 (FIG. 1) located beneath the tool and returned to the recirculating equipment where the anodic products of the reaction are removed, as by a centrifugal separator, and where the electrolyte is cooled prior to being returned to the machining area. A shield 67 (FIG. 2) is constructed around the tool and workpiece in order to prevent the electrolyte from being sprayed on the machine operator and on the other components of the apparatus.

Power is supplied to the tool 10 through its tool holder, and to the workpiece through the slip ring assembly 27 and the shaft 21, with the workpiece being made anodic with respect to the tool. The means supplying the current between the tool and the workpiece is of conventional design, but of high quality since it must supply a variable direct current of between zero and forty volts, and be essentially ripple free, that is contain less than one half of one percent, peak to peak, variation in its voltage level. An essentially ripple free power supply is necessary in order to obtain the accurate dimensioning and smooth surface finishes necessary for machining bearings. Furthermore, the power supply should have a response characteristic sufficient to hold the voltage constant over a five to one variation in current, the frequency of the variation being determined by the maximum speed of rotation anticipated. A ten cycle per second response is considered sufficient for the embodiment described herein.

The power supply means 70 shown in FIG. 1 includes a voltage control 71, with the voltage output being indicated by the meter 72, and the current flow to the tool being indicated by the ammeter 73. While manual means are shown to adjust the voltage level, it is contemplated that automatic means may also be used.

The depth to which metal is removed during each revolution of the workpiece is determined by many factors including the rate of movement of the workpiece material relative to the face of the tool, the length of the tool face in the direction of relative movement, the voltage and gap between the tool and the workpiece, electrolyte composition and temperature, and the feed rate or relative radial motion between the tool and the workpiece. In the embodiment of the invention described herein, the rate of rotation of the workpiece and the electrolyte composition and temperature are held constant by the supporting equipment, and the current density is maintained at a substantially constant level by increasing the voltage between the tool and the workpiece as the gap becomes larger in the case where the tool remains stationary.

The magnitude of the current is maintained at a first predetermined level normally greater than 3000 amperes per square inch and preferably in the order of 6000 amperes per square inch until the diameter of the bearing surface reaches the desired dimensions. This high current level is maintained in order to provide high rates of metal removal and a surface finish of less than five microinch, arithmetic average. However, a ferrous workpiece machined at these current levels will have a hazy, straw-like appearance. Therefore, the current density is lowered to a second predetermined level, typically between 1500 and 3000 amperes per square inch, for at least one revolution of the workpiece to provide a bright appearance to the surface finish. The current is then terminated quickly, in order to prevent a black line on the surface which may occur if the electrochemical machining operation is allowed to continue at a lower current density.

The length of the frontal machining surface in the direction of relative movement between the tool and the workpiece at the left end of the bearing surface 74 is made proportionately longer where the diameter of the workpiece is greater and therefore where the relative rate of movement between the workpiece and the tool is higher.

A typical workpiece 15, such as a bearing race, is shown in FIG. 8. Adjacent each end of the bearing surface 74 are two recesses 75 and 76 which serve primarily to allow the bearing surface to be machined precisely throughout its extent. While a conically shaped workpiece is described, it is to be understood that any rotating workpiece may be machined according to the principles outlined herein. As shown in FIG. 7, the recesses 75 and 76 adjacent the bearing surface 74 are formed by extended portions 77 and 78 at the extreme edges of the tool where the time of exposure to the workpiece is proportionately longer.

The following table illustrates typical dimensions for the tool and the workpiece shown in FIGS. 7 and 8.

| Tool | Workpiece |
| --- | --- |
| A—0.800 inch | a—3.000 inch |
| B—0.760 inch | b—1.500 inch |
| C—0.690 inch | c—1.750 inch |
| D—0.035 inch | d—1.500 inch |
| E—0.031 inch | e—14° |
| F—0.118 inch | |
| G—0.026 inch | |
| H—0.133 inch | |

The bearing surface 74 may be provided with a crown of approximately 0.000050 inch to facilitate the load carrying ability of the bearing and to increase its life. Providing such a crown on the bearing surface by conventional grinding methods is possible for only a few bearings, and is therefore costly in the production of a large number of bearings since the grinding tool must be resurfaced frequently. Using the electrochemical machining apparatus of this invention, the crown on the bearing surface is formed by modifying the area of the tool in the direction of relative movement by shaping the area of the frontal machining surface of the tool by milling, for example, since the depth of machining is proportional to the length of the tool in the direction of relative movement.

If the tool length is changed by 0.001 inch, then the rate of metal removal is changed by 0.00001 inch, a factor of 100 to 1. The surface 79 is a curve formed on a twelve inch radius on the perpendicular bisector of the line joining the ends of the machining surface, as shown in FIG. 7. Thus, it is apparent that accurate machining of the tool to provide complicated surface finishes is well within the present state of the art, and the frontal machining surface of the tool is therefore maintained flat in order to remove any variations in machining rate due to the contour of the tool itself.

The material in the plate 51 which is cut away in order to provide the surface configuration for machining the particular workpiece shown in the drawings is filled with an insulating material 80, and the top surface of this material is machined flat with the top surfaces of the upwardly extending portions 77 and 78 to insure smooth electrolyte flow in the passage 55, as described above. A plurality of holes 81 may be formed through the plate 51 in the area machined away in order to assist in bonding the insulating material 80 to the plate.

The insulating material 80 also serves to prevent stray electrical currents from the interior surface of the tool from degrading the surface finish of the workpiece. Since the distance between the workpiece and these interior surfaces is much greater than the gap between the workpiece and the frontal surface of the tool, the current densities from inside the tool will be lower than from the frontal surface. If a lower current density flow of current were permitted, the surface would not be as smooth sa possible, and in addition the surface would have a black appearance.

Any irregularities in the interface between the tool and the insulation or any discontinuity in the frontal surface of the tool where the insulation joins the tool could cause a poor surface finish since these irregularities may cause improper flow of electrolyte across the face of the tube or permit stray currents to flow from an internal surface of the tool to the workpiece. For this reason, it is important to insure that the frontal surface of both the tool and the insulating material be coplanar throughout the machining operation, and that no space exists between the plate 51 and the insulation 80.

The insulating material 80 is an epoxy type material (reaction product of epichlorohydrin and bisphenol A), and possesses essentially the same coefficient of thermal expansion as the material used for the tool. Additionally, the insulating material is non-porous, resistant to absorption of moisture for preventing passage of current through the insulating material to the workpiece, and relatively chemically inert with respect to the electrolyte being used. Typical insulating materials include a casting resin type RP–3260 available from Renn Plastics, Inc., of Lansing, Michigan or Stycast casting resin type 2651 MM, available from Emerson and Cuming of Canton, Mass.

In operation, the magnetic chuck 20 is energized and a workpiece 15 placed on its forward face 39. The workpiece is displaced by approximately 0.025 inch from the center of rotation of the chuck along a line perpendicular to a line which intersects the center of rotation of the chuck and the finishing edge 63 of the tool by adjusting the shoes 41 and 42 radially inwardly. The tool is positioned so that a gap of a first predetermined distance, typically 0.0015 inch, exists between its frontal machining surface and the surface of the workpiece to be machined.

The motor 25 is energized to rotate the workpiece at a speed of approximately 150 r.p.m. and the current density between the workpiece and tool is adjusted to the highest practical level, approximately 6000 amperes per square inch, to provide the smoothest surface finishes and the highest machining rates. Electrolyte is fed into the gap between the tool and the workpiece at a pressure of approximately 350 p.s.i. which gives an electrolyte flow velocity in the order of 400 to 500 feet per second. This high velocity flow insures adequate removal of the reaction products of the electrochemical machining operation.

When a relatively large amount of material is to be removed from the surface of the workpiece, the tool will be fed toward the workpiece at a rate which equals the material removal rate while maintaining the current density at the highest practical level consistent with the capacity of the tool to carry that current without damage thereto. Normally, the power supply will be connected in the constant voltage mode, and therefore as the gap distance between the tool and the workpiece varies during the initial machining of the workpiece due to the workpiece being out of round, the current will also vary. Also, since a differential taper may exist between the tool and the workpiece, it is essential that the current density at any point of the tool be limited to a value below that which will cause damage to the tool. After the surface of revolution of the workpiece becomes parallel to the tool, the total current flow may be increased since the same current density will then exist across the entire face of the tool.

The power supply may also be connected in the constant current mode to remove a uniform layer of material from the surface of the workpiece regardless of its out of round or surface characteristics. In this case, the total current can be limited so that no portion of the tool carries current exceeding its design characteristics.

In other applications, the tool may be adjusted to a predetermined distance from the workpiece and then remain fixed while the workpiece is machined, thus the gap distance will increase. This is particularly useful when removing small amounts of material, for example less than 0.003 inch. In this case, the voltage may be increased as the gap distance increases in order to maintain the same high current density throughout the entire operation, and therefore the highest possible surface finish.

After the workpiece has been machined to the desired dimensions, the current may be lowered momentarily, that is for at least one revolution of the workpiece, to a second lower predetermined magnitude, typically between 1500 and 3000 amperes per square inch, to provide the machined surface with a bright appearance. This is particularly useful with ferrous materials since machining at very high current densities leaves an apparent oxide coating on the machined surface, while machining between 1500 and 3000 amperes per square inch will leave the surface oxide free. It has been found, however, that current densities lower than approximately 1500 amperes per square inch will leave a black coating on the surface. For this reason, the current is terminated abruptly to stop the machining operation since a gradual reduction in current will leave a black line on the workpiece surface. Since the workpiece rotates at a relatively high speed, and since the amount of material removed during each revolution is in the order of 0.000010 inch, the discontinuity in the workpiece surface as a result of terminating the current will be corresponding small. In one embodiment, a relay in the line between the power supply and tool is used to terminate the current flow abruptly.

Using the techniques described above, rotating workpieces may be machined according to the method and apparatus of this invention to within 0.0001 inch or less of a desired diameter, and within an out of round tolerance in the order of 0.000060 inch or less, and a surface finish of five microinch, arithmetic average.

Although the invention has been described with reference to machining the exterior surface of a bearing, it will be understood by those skilled in the art that the procedures heretofore described may be used to machine the inside surface of a bearing member, or the like.

While the method and form of apparatus herein described constitutes a preferred embodiment of the invention, it is to be understood that the invention is not limited to this precise method and form of apparatus, and that changes may be made therein without departing from the scope of the invention which is defined in the appended claims.

What is claimed is:

1. The method of machining a workpiece to a precise final predetermined dimension to form thereon a surface of revolution having a smooth surface finish, said method comprising the steps of
    supporting the workpiece on a pair of spaced apart shoes engaging the surface of the workpiece to be machined;
    rotating said workpiece about a fixed axis of rotation;
    adjusting the shoes to displace the center of the workpiece away from said fixed axis of rotation so that as the workpiece is rotated, the center of the workpiece will be positively urged toward said axis of rotation;
    positioning an electrochemical machining tool adjacent the workpiece and outside said spaced apart shoes to form a gap of a predetermined distance;
    supplying a high velocity flow of electrolyte into the the gap between the tool and the workpiece;
    connecting the source of current between the tool and the workpiece such that the workpiece is anodic with respect to the tool to cause machining of the workpiece as it rotates past the tool to move the center of the workpiece toward the axis of rotation;
    maintaining the magnitude of the current flow above a first predetermined level to provide rapid machining of the workpiece and to provide a smooth surface finish; and
    terminating the current flow suddenly when the workpiece has been machined to its final predetermined dimension.

2. The method defined in claim 1 wherein said tool is moved toward the workpiece at a rate which maintains the gap between the tool and the workpiece at said predetermined distance.

3. The method defined in claim 1 wherein the frontal surface of the tool is substantially normal to a line from the tool to the center of the workpiece when the workpiece has been machined to its final dimension.

4. The method of claim 1 wherein the magnitude of said first predetermined level of current flow is greater than 3000 amperes per square inch.

5. Apparatus for machining a workpiece to a precise final dimension and to form thereon a surface of revolution having a smooth surface finish, said apparatus comprising
    means for rotating the workpiece about a fixed axis of rotation;
    means for engaging and supporting the surface of the workpiece being machined at spaced apart locations, said engaging means being positioned to displace the center of the workpiece away from said fixed axis of rotation causing the workpiece, as it is rotated, to be positively urged toward said engaging means;
    an electrochemical machining tool mounted outside said spaced apart engaging means at substantially right angles to the line of displacement of the workpiece and positioned initially to form a gap of a predetermined distance from the workpiece;
    means for moving said tool into the workpiece at a rate which maintains said predetermined distance essentially constant;
    means for supplying a high velocity flow of electrolyte to the gap between said tool and the workpiece; and
    means for supplying electrical current to said tool and the workpiece such that the workpiece is anodic with respect to the tool so that workpiece material is electrochemically removed as the workpiece rotates past said tool.

6. The apparatus as defined in claim 5 wherein said electrochemical machining tool has an essentially flat frontal surface positioned substantially normal to a line from said tool to the center of the workpiece when the workpiece has been machined to its desired dimension.

7. The apparatus as defined in claim 6 wherein said electrochemical machining tool further includes a straight finishing edge so positioned that it is on said line extending from said tool to the center of the workpiece.

8. The apparatus as set forth in claim 5 wherein said workpiece is a bearing race, wherein said tool has an essentially flat frontal surface, and wherein the dimension of said tool transverse to the direction of rotation of the workpiece is such as to form a crown on the race to improve its load carrying capacity.

9. The apparatus as set forth in claim 5
wherein said means for rotating the workpiece includes a magnetic chuck having a smooth workpiece engaging portion to permit the workpiece to be held for rotation while sliding on said engaging portion;
wherein said means for engaging and supporting the workpiece includes two spaced apart shoes, said shoes being adjusted to displace the center of the workpiece away from the axis of rotation to cause the workpiece to be positively urged toward said engaging means as the workpiece is rotated.

10. The apparatus as set forth in claim 5 wherein said electrochemical machining tool has an essentially flat frontal surface for machining the workpiece, said tool further including insulation surrounding said frontal surface and coplanar therewith; and
wherein said means for supplying electrolyte includes an insulated electrolyte channel in said tool having an exit port the length of and coplanar with said frontal surface whereby a high velocity flow of electrolyte is caused to flow across the entire machining surface of the tool and between the tool and the workpiece to provide a path for the flow of electrical current and to remove the heat generated during and the reaction product of the electrochemical machining action.

11. The apparatus as set forth in claim 5 wherein said means for supplying electrical current includes a variable voltage power supply that is essentially ripple free, having less than one-half of one percent voltage variation, peak to peak.

References Cited

UNITED STATES PATENTS

| | | | |
|---|---|---|---|
| 2,473,290 | 6/1949 | Millard | 204—224 |
| 3,287,245 | 11/1966 | Williams | 204—224 |
| 3,445,372 | 5/1969 | Fromsen | 204—212 |

JOHN H. MACK, Primary Examiner

N. A. KAPLAN, Assistant Examiner

U.S. Cl. X.R.

204—224